United States Patent [19]
Freeman

[11] Patent Number: 5,218,011
[45] Date of Patent: Jun. 8, 1993

[54] COMPOSITION FOR PROTECTING THE CONTENTS OF AN ENCLOSED SPACE FROM DAMAGE BY INVASIVE WATER

[75] Inventor: Clarence S. Freeman, Channelview, Tex.

[73] Assignee: WaterGuard Industries, Inc., Houston, Tex.

[21] Appl. No.: 703,692

[22] Filed: May 20, 1991

Related U.S. Application Data

[63] Continuation of Ser. No. 453,596, Dec. 20, 1989, abandoned, which is a continuation-in-part of Ser. No. 335,182, Apr. 7, 1989, abandoned, which is a continuation-in-part of Ser. No. 253,914, Oct. 6, 1988, abandoned, and a continuation-in-part of Ser. No. 181,833, Apr. 15, 1988, abandoned, said Ser. No. 253,914, is a continuation of Ser. No. 45,889, May 1, 1987, abandoned, Ser. No. 45,889, May 1, 1987, and Ser. No. 181,833, May 1, 1987, each is a continuation-in-part of Ser. No. 993,007, Dec. 8, 1986, Pat. No. 4,752,997, which is a continuation-in-part of Ser. No. 844,144, Mar. 26, 1986, Pat. No. 4,711,022.

[51] Int. Cl.$^5$ ............................................. H02G 15/00
[52] U.S. Cl. ................................... 523/173; 524/445; 524/447; 524/502; 524/517; 524/522; 524/528; 524/548; 524/556; 524/559
[58] Field of Search ............... 523/173; 524/445, 447, 524/502, 517, 522, 528, 548, 556, 559

[56] References Cited

U.S. PATENT DOCUMENTS

| | | | |
|---|---|---|---|
| H 624 | 2/1987 | Handlin, Jr. et al. ............... | 428/462 |
| Re. 30,715 | 8/1981 | Woytiuk ............................ | 174/23 C |
| Re. 32,649 | 4/1988 | Brandt et al. .................... | 604/368 |
| 2,810,716 | 10/1957 | Markus ............................. | 526/232.1 |
| 3,220,960 | 11/1965 | Wichterle et al. ................ | 521/149 |
| 3,340,875 | 9/1967 | Dudley et al. .................... | 604/359 |
| 3,347,974 | 10/1967 | Arendt et al. .................... | 174/23 R |
| 3,403,089 | 9/1968 | Joyce .............................. | 204/181.6 |
| 3,445,362 | 5/1969 | Chow et al. ...................... | 204/181.1 |
| 3,538,235 | 11/1970 | Arendt et al. .................... | 174/23 |
| 3,589,364 | 6/1971 | Dean et al. ....................... | 128/284 |
| 3,661,358 | 5/1972 | Dill .................................. | 427/239 |
| 3,661,815 | 5/1972 | Smith ............................... | 525/54.32 |
| 3,775,548 | 11/1973 | Zinser et al. ..................... | 174/23 C |
| 3,880,752 | 4/1975 | Premo ............................. | 210/600 |
| 3,893,962 | 7/1975 | Walton et al. .................... | 523/173 |
| 3,939,882 | 2/1976 | Gillemot ........................... | 141/23 |
| 3,990,872 | 11/1976 | Cullen .............................. | 55/274 |
| 3,996,413 | 12/1976 | Foord et al. ..................... | 174/23 C |
| 4,002,819 | 1/1977 | Woytiuk ........................... | 174/23 C |
| 4,004,077 | 1/1977 | Woytiuk ........................... | 174/23 C |
| 4,008,197 | 2/1977 | Brauer et al. .................... | 260/31.6 |
| 4,036,360 | 7/1977 | Deffeyes .......................... | 428/35 |
| 4,058,124 | 11/1977 | Yen et al. ........................ | 128/284 |

(List continued on next page.)

FOREIGN PATENT DOCUMENTS 0031789 7/1981 European Pat. Off.
00188959 7/1986 European Pat. Off.

(List continued on next page.)

OTHER PUBLICATIONS

Billmeyer, Jr., Fred W., *Textbook of Polymer Science*, 3rd Ed., John Wiley & Sons, New York, 1984, p. 519.
Diagnetics Technical Bulletin: Insulgard, Diagnetics, Inc. (1984).

*Primary Examiner*—Joseph L. Schofer
*Assistant Examiner*—R. H. Delmendo
*Attorney, Agent, or Firm*—Vaden, Eickenroht, Thompson, Boulware & Feather

[57] ABSTRACT

A gel composition including a gel matrix with a thickener having a water absorbent polymer with pendent anionic groups dispersed therein. Preferred thickeners are organophilic clays such as bentonite and mixtures of such clays with waxes, silica and/or ethylene or polyethylene microspheres.

The gel composition is activated with moisture so that the water absorbent polymer migrates to engage and absorb the water. The composition can be used to protect enclosed components or contents from water damage. Also, the gel composition protects wires which carry a small dc current such as the wires of telecommunication cables and splices. The composition eliminates shorts caused by water contact with such wires.

18 Claims, No Drawings

U.S. PATENT DOCUMENTS

| | | | |
|---|---|---|---|
| 4,105,033 | 8/1978 | Chatterjee et al. | 128/285 |
| 4,124,116 | 11/1978 | McCabe, Jr. | 206/204 |
| 4,129,544 | 12/1978 | Craig | 428/334 |
| 4,144,252 | 3/1979 | Wang et al. | 526/310 |
| 4,194,995 | 3/1980 | Schermann et al. | 524/50 |
| 4,238,638 | 12/1980 | Cretney et al. | 174/23 C |
| 4,242,206 | 12/1980 | Estabrooke | 210/489 |
| 4,245,250 | 3/1981 | Glowaky et al. | 525/350 |
| 4,295,987 | 10/1981 | Parks | 252/194 |
| 4,308,416 | 12/1981 | Herman et al. | 174/23 C |
| 4,366,075 | 12/1982 | Beach | 252/28 |
| 4,366,284 | 12/1982 | Ishido et al. | 524/447 |
| 4,388,485 | 6/1983 | Zeidler et al. | 174/23 C |
| 4,419,236 | 12/1983 | Hsu | 210/282 |
| 4,442,173 | 4/1984 | Takegami et al. | 428/372 |
| 4,443,312 | 4/1984 | Hennon | 204/181 |
| 4,446,261 | 5/1984 | Yamasaki et al. | 524/40 |
| 4,454,055 | 6/1984 | Richman et al. | 252/194 |
| 4,497,930 | 2/1985 | Yamasaki et al. | 524/556 |
| 4,505,976 | 3/1985 | Doehnert et al. | 524/55 |
| 4,535,098 | 8/1985 | Evani et al. | 521/149 |
| 4,566,943 | 1/1986 | Hansson et al. | 162/168.2 |
| 4,588,505 | 5/1986 | Walley et al. | 210/502.1 |
| 4,608,173 | 8/1986 | Watanabe | 210/502.1 |
| 4,616,063 | 10/1986 | Le-Khac | 525/91 |
| 4,618,631 | 10/1986 | Takeda et al. | 521/109.1 |
| 4,639,483 | 1/1987 | Billigmeier et al. | 523/173 |
| 4,654,039 | 3/1987 | Brandt et al. | 604/368 |
| 4,690,971 | 9/1987 | Flesher et al. | 524/555 |
| 4,711,022 | 12/1987 | Freeman et al. | 29/825 |
| 4,721,832 | 1/1988 | Toy | 29/868 |
| 4,747,960 | 5/1988 | Freeman et al. | 210/689 |
| 4,752,997 | 12/1988 | Freeman et al. | 29/402.18 |
| 4,756,851 | 10/1989 | Billigmeier | 252/572 |
| 4,849,484 | 9/1990 | Heard | 525/221 |

OTHER PUBLICATIONS

| Number | Date | Country |
|---|---|---|
| 85402590.5 | 7/1986 | European Pat. Off. . |
| 2007163 | 9/1971 | Fed. Rep. of Germany . |
| 2250042 | 5/1974 | Fed. Rep. of Germany . |
| 2755568 | 6/1979 | Fed. Rep. of Germany . |
| 1473753 | 3/1967 | France . |
| 2456375 | 5/1980 | France . |
| 2566955 | 1/1986 | France . |
| 185112 | 5/1980 | New Zealand . |
| 204472 | 8/1985 | New Zealand . |
| 88/08440 | 11/1988 | PCT Int'l Appl. . |
| 1146613 | 3/1969 | United Kingdom . |
| 1200395 | 7/1970 | United Kingdom . |
| 1400264 | 7/1975 | United Kingdom . |
| 1598807 | 9/1981 | United Kingdom . |
| 2080998 | 2/1982 | United Kingdom . |

COMPOSITION FOR PROTECTING THE CONTENTS OF AN ENCLOSED SPACE FROM DAMAGE BY INVASIVE WATER

This application is a continuation of co-pending application Ser. No. 07/453,596, filed on Dec. 20, 1989, now abandoned. which is a continuation-in-part of application Ser. No. 07/335,182, entitled COMPOSITION FOR PROTECTING THE CONTENTS OF AN ENCLOSED SPACE FROM DAMAGE CAUSED BY INVASIVE WATER, filed on Apr. 7, 1989, now abandoned. Application Ser. No. 07/355,182 is itself a continuation-in-part of applications Ser. No. 07/253,914, entitled COMPOSITION FOR PROTECTING COMMUNICATION WIRES, filed on Oct. 6, 1988, now abandoned, and Ser. No. 07/181,833, entitled COMPOSITION WITH TACKIFIER FOR PROTECTING COMMUNICATION WIRES, filed on Apr. 15, 1988, now abandoned Ser. No. 07/253,914 is a continuation of application Ser. No. 07/045,889, having that same title, which was filed on May 1, 1987 now abandoned and which is now abandoned. Both application Ser. Nos. 07/045,889 and 07/181,833 are continuation-in-part applications of Ser. No. 06/939,007, filed Dec. 8, 1986, now U.S. Pat. No. 4,752,997 entitled CABLE MAINTENANCE APPARATUS AND METHOD, which is in turn a continuation-in-part of application Ser. No. 06/844,144 filed Mar. 26, 1986,now U.S. Pat. No. 4,711,022 entitled METHOD FOR WIRE INSULATION.

BACKGROUND OF THE INVENTION

1. Field of the Invention

This invention is for a gel chemical composition. The gel composition is activated by moisture to absorb water and is used to protect electrical or other components contained within an enclosure from water damage. The composition has particular utility when introduced into confined areas such as instrument casings, housings for cable lines, splices or junction boxes, and the sheath of electric distribution, telecommunications, coaxial, or fiber optic cables to protect the contents or conductors contained therein from water damage for extended periods of time. The gel can be introduced into a housing, cable, or junction box prior to or during service. The gel composition is also incorporated into the cable itself, both between conductors in a bundle and/or between the bundles of conductors contained in the cable. Regardless of the use, not only does the gel prevent the entry of water, but the composition also eliminates shorts caused by water of the conductors in the cable, such as in telephone cables or splices which carry a small dc current, and restores current flow through the wire.

2. Description of the Prior Art

Communications cables such as telephone lines are made up of a multitude of pairs of conducting wires, typically copper wire, which are insulated from each other with a thin layer of a thermoplastic resin such as polyethylene or other materials and bundled by an insulating material. Bundles of pairs of conducting wires are then wrapped with a sheath of plastic, paper wrapping or other material, into a cable. Fillers such as a petroleum gel or an extended thermoplastic rubber compound (ETPR) are added to many cables inside the cable cover to fill the interstitial spaces, the objective being to exclude water from the cable and to prevent any water which does enter from migrating inside the cable.

Because telecommunications cable must be able to withstand exposure to water, the industry has promulgated certain performance standards which the cable must achieve. In particular, AT&T has issued a standard resulting from work conducted by Bell Laboratories which must be attained by all cable installed by the Bell operating companies that requires that a three foot long horizontal section of cable not pass any water for one hour when maintained under a column of water three feet high. The Bell companies are currently considering a change in that standard to require that a section of cable seven feet long withstand twelve feet of water head for twenty four hours. On information and belief, that latter standard has not been achieved to date.

It is likewise essential to prevent the exposure of many other types of conductors, electrical components or other instruments to invasive water. For instance, many microprocessor-controlled electromechanical devices include motors and switches which, along with the microprocessor, are driven by low voltage dc current. If exposed to moisture, such devices are susceptible to electrical shorts, especially at those points at which a circuit board is connected to the wiring and the points at which the wiring is connected to the switches and motors, because those points generally are not insulated. Even though such connections are usually enclosed by a housing or other protective covering, once moisture invades the housing, e.g., even by condensation of water vapor, those connections are readily accessible to the moisture.

In the case of telecommunications equipment, one method of providing protection for the conductors, whether in a splice or a cable, includes wrapping the bundle of conductors with a flexible material and injecting a liquid epoxy or urethane into the housing around the bundles which solidifies within the housing. Such a composition must be mixed on site and is typically injected by gravity flow into the housing. The material typically does not fill the entire interior of the casing and leaves voids. These voids or channels can create an avenue for the entrance of water, particularly at either end of the bundle that exits the housing and forms one of the wire bundles of the cable splice. The material, along with the wrapping around the splices in the housing, also can cause a funnel effect such that the water enters through a fissure in the cable sheath at either end of the closure around the cable and into the cable to the spliced wires.

As noted above, protection of the cable against water invasion is provided by filling the spaces between the wrapped bundles of conducting wires inside the cable and the interstices between pairs of conductors in each bundle (referred to as the filling zone) with compounds such as urethanes, epoxies, polystyrene foams, ETPRs, petroleum jellies and/or other hydrophobic materials. The patent literature also describes cables including water swellable polymers such as polyvinyl alcohol, polyacrylamides, or cellulose derivatives, which are applied to bundle wrappings or contained in "moisture barriers" which are spaced along the length of the cable outside of the conductor bundles and under the sheath (that area outside the bundles and under the sheath being referred to as the flooding zone).

Such cables are, however, characterized by a number of limitations and disadvantages. In the case of those which include a polymer which swells in the presence of water, such as a cellulose derivative, such polymers are typically provided in a granular or powder form. As such, distribution of the polymer throughout the flooding zone is problematical such that effective water absorbence is not assured throughout the flooding zone. Further, when sufficient water and polymer are present, the swelling of the polymer becomes problematical in a confined space. Another problem is that the water-absorbent polymer, especially in the case of cellulose derivatives and other naturally-occurring polymers, may be susceptible to bacterial attack, resulting in production of acids and other by-products which degrade the components of the cable.

Petroleum gels and ETPRs are generally used as filling compounds because the water-swellable materials used in the flooding zone are conductive once they absorb water, and also in part because all known substitutes suffer from one or more disadvantages which limit their utility such that petroleum gels represent the least expensive alternative. However, petroleum gels are also characterized by certain disadvantages. For instance, petroleum gels are relatively ineffective at water blockage in a bundle of conductors which is exposed to water because they must be applied hot. The heat tends to degrade the insulation around the individual conductors and, after cooling, the gel shrinks, leaving passages for entry and migration of water. At low temperatures, the gel imparts stiffness to the cable, hampering installation. Those same temperature-related problems affect fiber optic cables. Also, the gel is difficult to remove from the conductors during splicing and terminating the cable.

Replacing the gel with a powdered filling material which reacts with water to form a gel which blocks the water is also described in the patent literature. However, such powders are also characterized by a number of disadvantages and limitations. For instance, on contact with water, and as noted above, powders alter the electrical characteristics of the conductors in the bundles in the cable by increasing conductivity to the point that thicker insulation may be required around the conductors and the bundle, thereby increasing the cost of the cable. Using lower concentrations of the polymer in the filling material compromises the water blockage capabilities of the filling material. Further, certain swelling agents such as polyvinyl alcohols and polyacrylamides do not swell quickly enough in cold water to effect proper water blockage when the bundle is only partially filled while filling the bundle completely with such agents is prohibitively expensive and causes problems with swelling in the confined space when contacted by water.

In short, in spite of a continuing and long-felt need, and in spite of the many attempts which have been made to solve these problems, there is still a need for a water resistant cable, and specifically, for a composition which can be incorporated into a cable, splice, instrument housing, or other confined space, to prevent moisture-induced electrical problems. Specifically with regard to telecommunications cables, so far as is known, no material is available or suitable for use as both flooding and filling compound. Instead, water swellable polymers, when used at all, are generally used in the flooding zone and water resistant or hydrophobic impermeable materials are generally used in the filling zone.

SUMMARY OF THE INVENTION

The present invention is a gel composition which can be used in any enclosure to protect the contents thereof from water damage, but which has particular utility as both a filling and flooding compound that is incorporated into electrical cables during their manufacture. The gel composition also can be injected into a housing or other enclosure surrounding wires or splices to serve as protection from invasive water. The gel can also be introduced into the housing during the manufacturing process or after the housing is placed in service.

The composition is comprised of a fluid, a thickener for mixing with the fluid to form a gel matrix, and a water absorbent polymer having anionic groups attached to the polymeric backbone which is generally supplied in the form of a fine powder. This powdered water absorbent polymer is mixed with the dielectric gel matrix. In many cases, the dielectric gel matrix is hydrophobic and the addition of a hydrophilic substance is beneficial as explained below. The gel matrix does not inhibit or prevent the insulation of the wire, for instance, in a splice, because the matrix is not conductive to the current carried in the splices. The composition may optionally include a tackifier, which is of particular utility when the composition is used as a cable filler or as a gel injected into the housing or closure surrounding the wire conductors or splice. In that form, the gel can be introduced into the cable during manufacture; however, it is not necessary to incorporate a tackifier to be able to use the gel composition in that manner.

The gel composition itself provides an initial barrier to the entry of water into the confined space in which the gel is located. If water does enter the space, whether the space is the inside of a housing or splice, or the filling or flooding zone of a telecommunications cable, the water absorbent polymer in the gel is activated and the water is absorbed. In tests, water was placed adjacent to the gel composition. The fine powder-like polymer in the gel was seen traveling to the water adjacent the gel matrix. The polymer has exhibited this traveling effect for up to six inches from the initial gel matrix/water boundary. This effect appears to be the result of the water absorbent polymer seeking out the water. Once the water is contacted by the polymer in the gel, a highly viscous semi-solid material forms that is incapable of fluid movement. The addition of a hydrophilic substance to a gel matrix comprised of the polymer and hydrophobic materials appears to promote this traveling to the water effect.

I have found that the water absorbent polymers, having pendent anionic groups, when exposed to a small amount of dc current such as that present in the conductors of a telephone cable, appear to cause an attraction of the anionic groups of the polymer to the wires, the wires acting, in effect, as an anode. This apparent attraction of the polymer to the exposed wire brings the polymer into electrochemical association with the wire, and the accumulated polymer that develops around the exposed wire excludes water from the surface of the wire. As that layer builds up around the wire, the flow of current through the wire is re-established with the result that the short is eliminated or "healed". Depending on the components of the gel, the healing process can take as short a time as several minutes up to about 2 to 3 hours, after which current is established. The water absorbency often starts to occur instantaneously. Typically a fast acting gel composition is preferred.

The gel composition of the present invention therefore plays several roles in protecting the contents or components of a confined space such as a housing or cable from moisture damage. First, if there is invasive water, the gel composition repels the water. Additionally, in the presence of water, the water absorbent polymer of the gel is activated to travel out of the gel matrix to absorb the water. This traveling effect is particularly useful when the confined space is a cable containing a multitude of wires in a bundle having very small interstitial spaces there between. The polymer travels into the interstitial spaces if water is present, thereby causing a plugging effect to prevent further invasion of water into the filling zone. That benefit is derived whether or not any electrical current is present such that the present composition is also used to advantage in confined spaces in which non-electrical components are located. In the case of, for instance, damaged communication cables or splices which carry a low level dc current, an additional benefit is that any shorts which are caused by the presence of water are healed by the gel composition. The gel composition both plugs the entry of water and heals the short, restoring current in the lines.

The gel composition can be varied as to desired viscosity as required by environmental conditions and manufacturing requirements. It is generally preferred that the viscosity range of the gel without a tackifier be from about 2 centistokes at 100° C. to about 90,000 centistokes at 40° C. The viscosity of the composition is a matter of choice for the service desired and is not intended to be limited by the specification of this presently preferred viscosity range. A thin or thick gel can be used. The optimum pentometer penetration measurement range for a gel without tackifier is from about 150 to about 425.

Re-entry into a splice housing filled with epoxy and urethane, a typical requirement of the industry, is difficult, if at all possible. The gel of the present invention can be re-entered with ease and manually cleaned off of the splice wires so that repairs can be made. The gel can then be re-used rather than discarded as is necessary with the prior art epoxy or urethane encapsulants.

A 25 pair, 24 gauge telecommunications cable manufactured for Applicant by an established, domestic cable manufacturer which includes the gel composition of the present advantage has met and exceeded the above-described standards for cable performance. For instance, one section of such cable that is just three feet in length has withstood twenty-three feet of water head (simulated with air pressure on water) for over twenty weeks, and another section of such cable that is five feet long has withstood sixty-nine feet of water head for over twenty weeks without passing any water. Those experiments are on-going such that it is possible that this level of performance will continue for an indefinite, additional period of time.

DESCRIPTION OF THE PREFERRED EMBODIMENTS

The water absorbent polymers which are suitable for use in connection with the composition of the present invention are those with a backbone having pendent anionic groups attached to the polymeric chain, and are preferably polymers of non-naturally occurring monomers so as to be less susceptible to bacterial degradation. The anionic groups can be carboxylate, sulfate, phosphate, sulfonate, phosphonate, or any other anionic groups which will form a negative charge on exposure to water, polycarboxylates being preferred. The preferred carboxylate polymers are those made from $\alpha,\beta$-ethylenically unsaturated mono- and dicarboxylic acids and/or anhydrides such as propenoic acids, $\alpha$-methylpropenoic acids, $\beta$-methylpropenoic acids, maleic acids, fumaric acids and the respective maleic and fumaric anhydrides. Particular success has been achieved using polymers of 2-propenoate, commonly referred to as polyacrylic acid or propenoic acid, and its derivatives, the anionic carboxylate groups of which, when exposed to aqueous conditions, yield a strongly negative charge along the polymer chain. The salt form of these polymers can be used with a variety of ions including, but not limited to, alkali metal ions such as lithium, sodium, potassium or alkali earth metals such as magnesium, calcium, strontium, barium, zinc or aluminum. The salt used depends on the valency of the anionic group attached to the polymeric backbone. Polymers of such polyacrylic acid derivatives are available from a number of sources, including Dow Chemical Corp., Stockhausen, Inc., Chemdal Corp., and ARCO Chemical.

Although the preferred water absorbent polymers are polycarboxylates, other superabsorbent polymers having anionic groups attached to the polymeric backbone, including acrylates, acrylamides, methacrylate, methacrylamide, acrylonitrile, methacrylonitrile, tri- and/or tetraethylene glycol, diacrylate, starch graft polymers of those polymers such as a starch-polyacrylonitrile graft polymer, cellulose, and cellulose derivatives such as carboxymethyl cellulose, may also be utilized to advantage. In addition to the above-listed sources, such polymers are available from Proctor & Gamble Co., Grain Processing Corp., and Chem-Mud, Inc. Such polymers are taught in a number of patents including, but not limited to, the water absorbing polymers described in the following patent literature:

| U.S. Pat. Nos. | | Foreign Patents |
| --- | --- | --- |
| 3,589,364 | 4,442,173 | EPO App'n |
| 3,661,815 | 4,443,312 | No. 188,959 |
| 3,669,103 | 4,446,261 | Japanese App'n |
| 3,670,731 | 4,497,930 | No. 57-125,871 |
| 3,880,751 | 4,616,063 | Japanese App'n |
| 4,105,033 | 4,618,631 | No. 59-3299 |
| 4,129,544 | 4,690,971 | |
| 4,295,987 | 4,849,484 | |

Even though polymers of cellulose and cellulose derivatives function in the manner described when dispersed in a gel matrix to form the composition of the present invention, such polymers are biodegradable over a period of several months. Consequently, polymers of non-naturally occurring monomers, which are so significantly less biodegradable that they are collectively referred to as being "non-biodegradable" throughout this specification, are preferred over polymers of cellulose and/or cellulose derivatives. For instance, polymers of polyacrylic acid and its derivatives as described above are resistant to degradation over a period of several years; experiments with one such polymer have shown no degradation for up to one year.

The water absorbent polymer is incorporated into the gel composition of the present invention in concentrations ranging from about 5 to about 33.3% by weight of the final composition, depending upon the particular polymer utilized. Although satisfactory results have been obtained with compositions including concentrations of polymer at both ends of that range (hence the use of the word "about" in describing the range), concentrations of from about 10 to about 30% are preferred, and in the case of the preferred polymers of polyacrylic acid and its derivatives, a concentration of from about 15 to about 30% is preferred. As a general rule, if a cellulose polymer, or a polymer of a cellulose derivative, is used, or if other polymers susceptible to bacterial attack are used, it is preferred that higher concentrations of polymer be used.

A number of compositions which are gels or can be thickened to form a gel have been used as a gel matrix. The gel matrix must be relatively nonconductive to a small dc current, e.g., dielectric. The matrix should provide a fairly uniform dispersal of the anionic polymer in the gel. The viscosity of the gel can be varied depending on the method used to introduce the composition into the confined space and the temperature and other conditions under which the composition will be used, the addition of a tackifier depending in part upon those same factors.

The gel matrices used in this composition include silicones, petroleum gels, high viscosity esters, glycols, polyglycols, olefins and fluorocarbons. Mixtures of polyalkylene glycols, polyalpha olefins and polyisobutylene, and such mixtures, along with standard mineral oils of various molecular weights, the latter being presently preferred for use as gel matrices in the composition of the present invention. Oil-containing gel matrices have been used to such advantage that such gel matrices are referred to collectively herein as dielectric oil gel matrices. The gel matrix is used to advantage in concentrations ranging from about 40 to about 95% by weight, depending in part upon whether a thickener is utilized. The preferred concentrations, depending on the particular material, range from about 40 to about 85% by weight, the particularly preferred concentration ranging from about 61.6 to about 84.75% by weight.

Gel matrices that are too hydrophobic have a tendency to coat the polymer and essentially shield the polymer from the water that the wire needs to be protected from. A small amount of a hydrophilic substance can be added to such hydrophobic gel matrices to counteract that tendency. The hydrophilic substance appears to provide a conduit for the water absorbent polymer to migrate to the moisture if required. A wide variety of materials are appropriate for use as a hydrophilic substance in the gel composition of the present invention in percentages of from about 1 to about 10% by weight. Particular success has been achieved with various straight and branched chain mono-, di-, and polyhydric alcohols including various polyalkylene glycols and mixtures and derivatives thereof and various alkanols and mixtures and derivatives thereof. For example, ethylene glycol, hexylene glycol, and polyalkylene glycol co-polymers randomly substituted with ethylene oxide and propylene oxide have been used to advantage, as have isopropyl alcohol and 2-ethyl hexanol. Other materials appropriate for use as a hydrophilic substance in connection with the composition of the present invention include mono- and polyenoic unsaturated fatty acids and mixtures of fatty acids such as oleic acid, palmitoleic acid, linoleic acid and linoleneic acids, as well as, for instance, tall oil, which includes oleic acid, and various commercially available detergents and surfactants and mixtures of detergents and/or surfactants such as derivatives of sorbitan mono-9-octadecenoate polyoxy-1,2-ethanediyl and 2,4,6,9-tetramethyl-5-decyn-4, 7-diol.

Thickeners are used to advantage in connection with the gel matrices of the composition of the present invention to achieve a desired viscosity. Suitable thickeners include those known in the art for thickening petroleum and fluorocarbon oils, gels, and greases, all collectively referred to herein as "fluids", such as waxes and petrolatums, as well as such materials as ethylene and polyethylene microspheres. Typical thickeners for gels, dielectric oils, and greases are pyrogenic silica, organophilic clays such as bentonite and hectorite, soaps such as metal stearates, and ureas, the presently preferred thickeners being organophilic clays. Those bentonite clays which do not need external polar activation, such as those available under the trademarks BARAGEL 3000 and NYKON 3000 (N.L. Chemicals, Inc., Hightstown, N.J.), are particularly preferred for use as thickeners in the composition of the present invention, but bentonites requiring activation (e.g., with acetone), such as BENTONE 24 (NL Chemicals, Inc.), have also been used to advantage.

The amount of the thickener which is utilized depends upon the viscosity desired, the particular fluid in which the thickener is used, and the specific thickener or thickeners. Generally, the thickener is used in a concentration of from about 5 to about 24% of the gel composition by weight. For instance, if a self-activating organophilic clay is utilized as the thickener in, for instance, a dielectric oil gel matrix, the preferred concentration of thickener is between about 5 and about 10% by weight. However, such thickeners have been used successfully in concentrations ranging from about 4 up to about 15%. If a petroleum hydrocarbon of, for instance, aliphatic or napthenic paraffins, or a mixture of the two paraffins, is used as a fluid for thickening into a gel matrix, the amount of wax or petrolatum(s) added as a thickener preferably ranges from about 2 to about 12%. The average molecular weight of the preferred paraffins ranges from 200 to 1,000, and such paraffins are used to prepare gel compositions with viscosities, depending upon the proportion of thickener, of from 5 to 200 centistokes at 40° C. Petroleum hydrocarbon thickeners must be free of impurities which could corrode the conductors in the instrument case, cable, or other confined space.

Particular success has been achieved using thickeners comprised of a mix of the various substances listed above. Such mixed thickeners may include, for instance, between about 4 and about 10% (total weight of the gel composition) of an organophilic clay such as bentonite, between about 2.1 and about 12% (total weight) of wax or petrolatum, between about 0.5 and about 9.81% (total weight) of pyrogenic silica, and between about 2.1 and about 18% (total weight) of ethylene or polyethylene microspheres. When such mixed thickeners are used, the thickener preferably comprises between about 11.91 and about 23.75% of the gel composition of the present invention.

The word "tackifier" as used throughout this specification refers to a substance which, when added to the gel matrix, causes the gel composition of the present invention to be sticky or "tacky", a useful property when it is desired to apply the gel composition to, for instance, the inside, vertical portion of an instrument housing. Increasing the tackiness of the gel composition may also be useful in manufacturing a telecommunications cable incorporating the gel composition of the present invention into the filling and flooding zones thereof.

Tackifiers which are appropriate for use in connection with the gel composition of the present invention include, but are not limited to, high viscosity polyisobutylene, polymethylmethacrylate (PMM), mixtures of PMM with petroleum oil, mixtures of PMM with polyolefins, and mixtures of high viscosity polyisobutylene and PMM. The phrase "high viscosity polyisobutylene" refers to polyisobutylene having a molecular weight of over 1200 which can be purchased commercially from, for instance, Exxon Chemical Co. Such high viscosity polyisobutylenes are a presently preferred tackifier, and are added to the gel composition of the present invention in concentrations ranging from about 0.125% by weight up to about 1%, depending upon the degree of tackiness desired for a particular application. Likewise, PMM or mixtures of PMM and other substances may be added, if at all, at concentrations of from about 0.125% up to about 1%. Higher and lower concentrations can be utilized; for instance, if polyisobutylene having a molecular weight averaging about 1200 is used, a 1.25% concentration of tackifier may be required for a particularly critical application. If polyisobutylene having an average molecular weight of 2300 is utilized as a tackifier, a concentration of 0.1% may be adequate for non-critical applications.

In addition, a corrosion inhibitor may be added to the composition of the present invention, generally in percentages by weight of less than 1%. Suitable corrosion inhibitors include certain corrosive inhibitors which are typically used in greases which were found to have no effect on the water absorbency or insulation characteristics of the polymer of the gel composition. The rust inhibitor(s) must be chosen with care because those which are of acid character may neutralize the effect of the polymer. A neutral barium dinonylnaphthalene sulfonate did not affect the properties of the present invention, but did have a slight tendency to de-gel one of the gel compositions. An example of an anti-corrosion agent which may be used to advantage in the gel composition of the present invention is the product available under the brand name IRGANOX (Ciba-Geigy Corp.). A copper passivator which is a liquid copper triazole derivative was used without any adverse affects. The copper passivator REOMET 39 (Ciba-Geigy Corp.) is an example of such an agent which is used satisfactorily in connection with the composition.

The gel matrix can also be colored with a dye when desired. The amount of dye is dependent on the deepness of color desired. A small amount of Automate green dye was satisfactory to impart a color to the gel matrix.

The following are examples of different combinations of gel matrices and fluids which thicken to produce a gel matrix which are appropriate for use with the water absorbent polymer having pendent anionic groups. The examples of compositions prepared in accordance with the invention are not intended to limit the scope of the invention and are instead illustrative of a number of different compositions which can be used to practice the invention.

EXAMPLE 1

A gel matrix was prepared using 20 parts by weight polyisobutylene (Amoco INDOPOL L-100), 4½ parts by weight polyalpha olefin and one part by weight polyalkylene glycol (Olin Chemical Corp., POLY-G 9150). Polyalkylene glycol is a random copolymer with 75% ethylene oxide and 25% propylene oxide substitution, with an average molecular weight of from 12,000 to 15,000 and a hydroxyl number between 5 to 10 mgs KOH per gram. The polyisobutylene has a viscosity ASTM D-445 38° C. of 210–227 and the viscosity index ASTM D-567 is 95. The polyalpha olefin used was a long chain polyalpha olefin SHF-61 manufactured by Mobil which had a viscosity ASTM D-445 at 38° C. of 30.5 and a viscosity index ASTM D-2270 of 132. The polyalpha olefins which are used, as exemplified by the SHF-61 Mobil product, are typically hydrocarbons with a molecular weight from 200 to 800. The SHF-61 product is an oligomer of 1-decene. The satisfactory viscosity range of the polyalpha olefins is from 2 centistokes at 100° C. to 100 centistokes at 100° C.

Twelve parts of the resulting mixture was mixed with one part of pyrogenic silica as a thickener. The resulting gel matrix was blended two parts by weight gel to one part by weight of the water absorbent polymer in the form of the partial sodium salt of crosslinked polypropenoic acid, referred to herein as 2-polypropenoate (Dow Chemical Co. XU43408.00 Experimental Absorbent Polymer, Product Code 06115).

A 12 V battery was hooked up to a pair of spliced wires and water was introduced into the spliced area causing a short. The spliced area was then filled with the composition of Example 1 and water began to be absorbed in 15 seconds. The short healed and conductance was restored to the wire pairs. Essentially the same results have been achieved using an identical composition including the water absorbent polymer characterized as polyacrylic acid and sold under the brand name FAVOR C 96 (Stockhausen, Inc., Greensboro, N.C.).

EXAMPLE 2

A gel composition in accordance with the present invention was prepared in the manner described in Example 1 and having the following contents (parts by weight).

| | |
|---|---|
| INDOPOL L-100 (Amoco Chemical Corp.) | 736 |
| Shell wax 130 (Shell Chemical Co.) | 25 |
| REOMET 39 (Ciba-Geigy Corp.) | 3 |
| FAVOR C96 (Stockhausen, Inc.) | 286 |
| AEROSIL R74 (Degussa Corp.) | 116.9 |
| MICROTHENE FA640 (Quantum Chemicals Corp.) | 25 |

EXAMPLE 3

A gel composition in accordance with the present invention was prepared in the manner described in Example 1 and having the following contents (parts by weight).

| | |
|---|---|
| DRAKEOL 34 (Penreco Corp.) | 610 |
| REOMET 39 (Ciba-Geigy Corp.) | 2.5 |
| BARAGEL 3000 (NL Chemicals, Inc.) | 50 |
| AEROSIL R74 (Degussa Corp.) | 15 |
| FAVOR C 96 (Stockhausen, Inc.) | 150 |
| MICROTHENE FA640 (Quantum Chemicals Corp.) | 172.5 |

When tested in accordance with ASTM D150 procedures, the composition was characterized as having a dielectric constant of 2.26 and a dissipation factor of 0.01, and when tested in accordance with ASTM D257, volume resistivity was $4.99 \times 10^{12}$.

EXAMPLE 4

A gel composition in accordance with the present invention was prepared in the manner described in Example 1 and having the following contents (parts by weight).

| | |
|---|---|
| DRAKEOL 34 (Penreco Corp.) | 610 |
| REOMET 39 (Ciba-Geigy Corp.) | 2.5 |
| BENTONE 24 (NL Chemicals, Inc.) | 50 |
| Acetone | 10 |
| AEROSIL R74 (Degussa Corp.) | 20 |
| FAVOR C 96 (Stockhausen, Inc.) | 150 |
| MICROTHENE FA640 (Quantum Chemicals Corp.) | 157.5 |

When tested in accordance with the procedures described in Example 3, the composition was characterized as having a dielectric constant of 2.12, volume resistivity of $5.91 \times 10^{12}$, and a dissipation factor of 0.01.

EXAMPLE 5

A gel composition in accordance with the present invention was prepared in the manner described in Example 1 and having the following contents (parts by weight).

| | |
|---|---|
| DRAKEOL 34 (Penreco Corp.) | 622.5 |
| REOMET 39 (Ciba-Geigy Corp.) | 2.5 |
| BARAGEL 3000 (NL Chemical, Inc.) | 40 |
| AEROSIL R74 (Degussa Corp.) | 5 |
| FAVOR C 96 (Stockhausen, Inc.) | 150 |
| MICROTHENE FA640 (Quantum Chemicals Corp.) | 180 |

When tested in accordance with the procedures described in Example 3, the composition was characterized as having a dielectric constant of 2.19, volume resistivity of $6.91 \times 10^{12}$, and a dissipation factor of 0.01.

EXAMPLE 6

A gel composition in accordance with the present invention having the following contents was prepared (all parts by weight).

| | |
|---|---|
| DRAKEOL 34 (Penreco Corp.) | 704.95 |
| REOMET 39 | 2.875 |
| IRGANOX 1010 (Ciba-Geigy Corp.) | 2.3 |
| BARAGEL 3000 (NL Chemical, Inc.) | 51.75 |
| AEROSIL R74 (Degussa Corp.) | 8.625 |
| FAVOR C 96 (Stockhausen, Inc.) | 172.5 |
| MICROTHENE FA750 (Quantum Chemicals Corp.) | 207 |

EXAMPLE 7

A gel composition in accordance with the present invention having the following contents was prepared (all parts by weight).

| | |
|---|---|
| DRAKEOL 34 (Penreco Corp.) | 324.8 |
| N1500 (Penreco Corp.) | 324.8 |
| REOMET 39 (Ciba-Geigy Corp.) | 2.8 |
| BARAGEL 3000 (NL Chemical, Inc.) | 61.6 |
| AEROSIL R74 (Degussa Corp.) | 5.6 |
| FAVOR C 96 (Stockhausen, Inc.) | 224 |
| MICROTHENE FA640 (Quantum Chemicals Corp.) | 176.4 |

EXAMPLE 8

Another gel composition was prepared having the following contents (all parts by weight).

| | |
|---|---|
| White oil (Calumet Refineries, La.) | 656.625 |
| REOMET 39 (Ciba-Geigy Corp.) | 2.125 |
| IRGANOX 1010 (Ciba-Geigy Corp.) | 4.25 |
| BARAGEL 3000 (NL Chemicals, Inc.) | 59.5 |
| FAVOR C 96 (Stockhausen, Inc.) | 127.5 |

EXAMPLE 9

Another gel composition was prepared having the following contents (all parts by weight).

| | |
|---|---|
| INDOPOL L-100 | 891 |
| BARAGEL 3000 (NL Chemicals, Inc.) | 120 |
| FAVOR C 96 (Stockhausen, Inc.) | 180 |
| REOMET 39 (Ciba-Geigy Corp.) | 3 |
| IRGANOX 1010 (Ciba-Geigy Corp.) | 6 |

EXAMPLE 10

Another gel composition was prepared having the following contents (all parts by weight).

| | |
|---|---|
| DRAKEOL 34 (Penreco Corp.) | 694.4 |
| REOMET 39 (Ciba-Geigy Corp.) | 2.8 |
| IRGANOX 1010 (Ciba-Geigy Corp.) | 5.6 |
| BARAGEL 3000 (NL Chemicals, Inc.) | 50.4 |
| FAVOR C 96 (Stockhausen, Inc.) | 168 |
| MICROTHENE FA640 (Quantum Chemicals Corp.) | 198.8 |

EXAMPLE 11

Another gel composition was prepared having the following contents (all parts by weight).

| | |
|---|---|
| INDOPOL L-100 (Amoco Chemical Corp.) | 862.4 |
| AEROSIL R74 (Degussa Corp.) | 120 |
| FAVOR C 96 (Stockhausen, Inc.) | 278 |
| REOMET 39 (Ciba-Geigy Corp.) | 3.2 |

Several of the formulations set out in Examples 2–11 have also been prepared and used to advantage with a polymer obtained from Chemdal Corp., stock no. 1125.

EXAMPLE 12

Another gel composition was prepared having the following contents (all parts by weight).

| | |
|---|---|
| N1500 (Penreco Corp.) | 711.025 |
| Witco X160 wax (Witco Chemical Corp.) | 119 |
| POLY-G 9150 (Olin Chemical Corp.) | 23.8 |
| REOMET 39 (Ciba-Geigy Corp.) | 2.975 |
| AEROSIL R74 (Degussa Corp.) | 35.7 |
| FAVOR C 96 (Stockhausen, Inc.) | 178.5 |
| MICROTHENE FA640 (Quantum Chemicals Corp.) | 119 |

When tested in accordance with the procedures described in Example 3, the composition was characterized as having a dielectric constant of 2.20, volume resistivity of $1.20 \times 10^{12}$, and a dissipation factor of 0.005. When the same composition was prepared by substituting Witco X180 wax for the Witco X160 wax, in the same proportion, the dielectric constant was 2.36, volume resistivity was $2.30 \times 10^{13}$, and the dissipation factor was 0.006.

EXAMPLE 13

Fluorocarbon gels have also been used as a gel matrix with the water absorbent polymer. NYE fluoroether grease 3834, a completely fluorinated grease, was used as the gel matrix. The fluoroether grease had viscosities of 26 centistokes at 210° F. and of 270 centistokes at 100° F. Seven grams of the NYE fluoroether was mixed with 3 gms of sodium 2-polypropenoate and 0.5 gms pyrogenic silica thickener. The water absorption and healing of the short was slow but effective when the resulting gel composition was tested as described in Example 1.

EXAMPLE 14

The 9.5 gms of the fluorocarbon matrix and polymer described in Example 15 was mixed with 0.5 gms of the polyalkylene glycol described in Example 1. The addition of the polyalkylene glycol to the fluorocarbon gel matrix caused instantaneous water absorption and correspondingly faster healing of the short when tested as described in Example 1.

EXAMPLE 15

Polyesters have also been used as a gel matrix in gel compositions including a water absorbent polymer. The polyesters ranged in molecular weight from 300 to 800 and had viscosities from 25 to 100 centistokes at 40° C. The polyesters were mixed with 10 to 30% of the polymer. The polyesters which have been utilized are esters of trimethylol propane, pentaerythritol and triallyl mellitate. When tested as described in Example 1, water absorption occurred in less than one minute and conductivity was restored after 20 minutes.

EXAMPLE 16

A fluid mixture was prepared using 20 parts by weight (Amoco INDOPOL L-100), 4½ parts by weight polyalpha olefin and one part by weight polyalkylene glycol. The polyalkylene glycol is a random copolymer with 75% ethylene oxide and 25% propylene oxide substitution with an average molecular weight of from 12,000 to 15,000 and a hydroxyl number between 5 to 10 mgs KOH per gram. The polyisobutylene has a viscosity ASTM D-445 38° C. of 210-227 and the viscosity index ASTM D-567 is 95 with a molecular weight of 750 to about 1200. The polyalpha olefin used was a long chain polyalpha olefin SHF-61 manufactured by Mobil which had a viscosity ASTM D-445 at 38° C. of 30.5, a viscosity index ASTM 2d-2270 of 132. The SHF-61 product is an oligomer of 1-decene. The satisfactory viscosity range of the polyalpha olefins is from 2 centistokes at 100° C to 100 centistokes at 100° C.

Twelve parts of the fluid mixture were mixed with one part of pyrogenic silica thickener (AEROSIL R74, Degussa Corp.) to make a gel matrix. The gel matrix had a dielectric constant of less than 3. The resulting gel matrix was blended two parts by weight gel to one part by weight of the water absorbent polymer 2-polypropenoate (Dow Chemical Co. XU43408.00 Experimental Absorbent Polymer). To this mixture a high viscosity polyisobutylene was added in the range of about 0.125% to about 1% by weight of the gel matrix as a tackifier. The high viscosity polyisobutylene has a molecular weight range of from about 1200 to 2300 and ASTM D-445 97.8° C.° of 3,000–5,000.

A 12 V battery was hooked up to a pair of spliced wires and water was introduced into the spliced area causing a short and the test described in Example 1 conducted. Water began to be absorbed in about sixty seconds, the short then healed and the cable pair became conductive.

EXAMPLE 17

The same composition of Example 16 can be used, substituting the tackifier polymethymethacrylate (PMM) for high viscosity polyisobutylene. The polymethylmethacrylate can also be used as the water absorbent polymer. However, when mixed with a diluent such as a petroleum oil, PMM serves as a tackifier. A typical preparation uses a PMM with a molecular weight of 2000–5000 mixed in a 6% solution with polyalpha olefin oligomers of 1-decene (such as Rohm and Haas Acriloid). This solution is added to the gel matrix and polymer mixture of Example 16 in the range of 0.125%–1% by weight to give a tacky composition.

EXAMPLE 18

A dielectric oil gel matrix was prepared using 50 parts by weight polyisobutylene (Amoco, INDOPOL I,-100), 40 parts by weight white oil (Penreco Corp., DRAKEOL 34) and 10 parts by weight by pyrogenic silica (Degussa Corp., AEROSIL R74). Seventy-five parts of the resulting mixture was blended to 25 parts by weight of the water absorbent polymer in the form of a starch-polyacrylonitrile graft copolymer (WATER LOCK, Grain Processing Corp.). The resulting gel composition, when tested as described in Example 1, began water absorption in about eight minutes, and the short was eliminated shortly thereafter.

EXAMPLE 19

A gel matrix was prepared using 50 parts by weight polybutylene (Amoco, INDOPOL L-100), 40 parts by weight white oil (Penreco Corp., DRAKEOL 34) and 10 parts by weight pyrogenic silica (Degussa Corp., AEROSIL R74). Seventy-five parts of the resulting mixture was blended to 25 parts by weight of the water absorbent polymer in the form of a methyacrylamide polymer (sold under the brand name CHEM-MUD, Chem-mud, Inc., Leiscester, N.C.). The resulting gel composition, when tested as described in Example 1, began water absorption in about ten minutes, and the short was eliminated shortly thereafter.

EXAMPLE 20

The gel composition of the present invention can also be prepared using white oils of petroleum hydrocarbon stocks of aliphatic or napthenic paraffin as a dielectric oil gel matrix. Compositions have been prepared using white oils manufactured by Penreco Corp., specifically those sold under the brand name DRAKEOL such as DRAKEOL 7, 19, 34, 35 and DRAKEOL 4410, and those manufactured by Witco Corp. and sold under the brand name KAYDOL. The preferred oils for making appropriate dielectric oil gel matrices are those having a viscosity in the range of from about 150 to about 600.

It has been found that the use of petroleum waxes or low oil cream petrolatums produces a higher viscosity dielectric oil gel matrix, thereby reducing the amount of pyrogenic silica used as a thickener as compared to the amounts set forth in the preceding examples. For instance, a composition similar to the composition prepared in Example 1 was prepared substituting a 150 vis waxie hydrated distillate oil (Penreco Corp.) for the polyisobutylene described in that example. The fluid mixture was prepared using 91.8% by weight of the waxie oil, 1.6% polyalkylene glycol (Olin Chemical Corp., POLY-G 9150) and 6.6% microcrystalline wax (Witco Chemical Corp., Witco X-145-A). The dielectric oil gel matrix was prepared by adding 1.0% by weight pyrogenic silica (Degussa Corp., AEROSIL R74) and 14.7% by weight of high density linear polyethylene powder (Quantum Chemicals Corp., MICROTHENE FA750) to the fluid mixture. To this gel matrix was then added 25.9% by weight of sodium salt of polyacrylic acid (Stockhausen, Inc., FAVOR C 96) to form a gel composition. When tested in accordance with the procedure described in Example 1, water encapsulation began within five minutes, electrochemical deposition of the polymer insulation began in ten minutes, and the short was healed in twenty minutes.

EXAMPLE 21

The composition of Example 20 was also prepared by substituting a non-hydrated oil for the waxie distillate oil, in particular, Penreco HG Bright Stock Oil, and the addition of 5% Penreco low cream oil petrolatum. When tested in accordance with the above-described procedure, this composition performed in much the same manner as the gel composition of Example 1.

EXAMPLE 22

A dielectric oil gel matrix was prepared using 80 parts by weight white oil (Penreco Corp., DRAKEOL 4410) and 15 parts by weight of a microcrystalline wax (Witco Corp., X145-A) to 5 parts by weight pyrogenic silica (Degussa Corp., AEROSIL R74). Eighty parts by weight of the resulting gel matrix was blended with 20 parts by weight of the water absorbent polymer in the form of the sodium salt of a polymer of maleic anhydride obtained from ARCO Chemical which, on information and belief, is a polymer of the type described in U.S. Pat. No. 4,616,063. The resulting gel composition, when tested as described in Example 1, began water absorption in about 10 minutes, and the short was eliminated shortly thereafter. Similar results were obtained using a water absorbent polymer of fumaric anhydride.

Although the invention has been described in terms of a number of examples setting forth preferred embodiments thereof, those skilled in the art who have the benefit of this disclosure will recognize that changes may be made in the compositions described in these various examples without changing the manner in which the various components of the gel composition of the present invention function to accomplish the results achieved by these compositions. Such changes might, for instance, take the form of small variations in the proportions of the various components, the substitution of some substance having a similar function not mentioned in the specification for one of the components of the gel composition, or the addition of a substance to one of the gel compositions described. Such changes are intended to fall within the spirit and scope of the present invention as set out in the following claims.

What is claimed is:

1. A composition for protecting electrical components in an enclosed space from shorts caused by the presence of water comprising:
   a dielectric oil;
   an organophilic clay mixed with said dielectric oil for thickening said dielectric oil to form a gel matrix; and
   a non-biodegradable water absorbent polymer dispersed in said gel matrix, said polymer having anionic groups attached to the polymeric backbone thereof, the anionic groups of said polymer, when exposed to direct current from an electrical component that is in a condition of short caused by the presence of water, causing said polymer to be attracted to the electrical component, the electrical component acting as an anode to draw the anionic groups of said polymer into electrochemical association with the electrical component, the accumulated polymer insulating the electrical component and eliminating the short to restore current through the electrical component.

2. The composition of claim 1 wherein said gel matrix comprises between about 61.6 and about 84.75% of said composition by weight.

3. The composition of claim 1 wherein said organophilic clay comprises between about 4 and about 10% of said composition by weight.

4. The composition of claim 1 wherein said dielectric oil is a white oil.

5. The composition of claim 1 wherein said organophilic clay is bentonite.

6. The composition of claim 1 wherein said polymer comprises between about 10 and about 33.3% of said composition by weight.

7. The composition of claim 1 wherein said polymer is selected from the group consisting of polymers of acrylic acids, α-methylpropenoic acids, β-methylpropenoic acids, maleic acids, fumaric acids, and the respective maleic and fumaric anhydrides.

8. The composition of claim 1 wherein the anionic groups of said water absorbent polymer are selected from the group consisting of carboxylate, sulfate, sulfonate, phosphate, phosphonate groups and mixtures thereof.

9. A composition for protecting wires which carry a small dc current from damage caused by the presence of water comprising:
   a water absorbent polymer having carboxylate groups attached to the polymeric backbone thereof; said water absorbent polymer being present in an amount ranging from about 5 to about 33.3% by weight of said composition;
   a dielectric oil mixed with said water absorbent polymer; and
   an organophilic clay mixed with said dielectric oil for thickening said dielectric oil to form a gel matrix in which said polymer is dispersed, said dielectric oil and said organophilic clay comprising between about 61.6 and about 84.75% of said composition by weight, said gel matrix being relatively non-conductive to a small dc current.

10. The composition of claim 9 wherein said organophilic clay is bentonite.

11. The composition of claim 9 wherein said polymer comprises between about 10 and about 33% of said composition by weight.

12. The composition of claim 11 wherein said polymer is selected from the group consisting of polymers of acrylic acids, α-methylpropenoic acids, β-methylpropenoic acids, maleic acids, fumaric acids, and the respective maleic and fumaric anhydrides.

13. A composition for protecting the contents of an enclosed space from water damage comprising:
- a water absorbent polymer having anionic groups attached to the backbone thereof; said polymer being present in an amount ranging from about 5 to about 33.3% by weight of said composition;
- a dielectric oil; and
- a thickener comprised of a mixture of two or more of a wax, an organophilic clay, silica, or polyethylene micropheres mixed with said dielectric oil to form a gel matrix in which said polymer is dispersed and which is relatively non-conductive to direct current.

14. The composition of claim 13 wherein said gel matrix comprises between about 61.6 and about 84.75% of said composition by weight.

15. The composition of claim 13 wherein said organophilic clay is bentonite.

16. The composition of claim 15 wherein said polymer comprises between about 10 and about 33% of said composition by weight.

17. The composition of claim 15 wherein the anionic groups of said polymer are selected from the group consisting of carboxylate, sulfate, sulfonate, phosphate, phosphonate groups and mixtures thereof.

18. The composition of claim 15 wherein said polymer is selected from the group consisting of polymers of acrylic acids, α-methylpropenoic acids, β-methylpropenoic acids, maleic acids, fumaric acids, and the respective maleic and fumaric anhydrides.

* * * * *